US009794449B2

(12) United States Patent
Kim

(10) Patent No.: US 9,794,449 B2
(45) Date of Patent: Oct. 17, 2017

(54) METHOD FOR CORRECTING COLOR USING RGB DATA

(71) Applicant: SILICONFILE TECHNOLOGIES INC., Gyeonggi-do (KR)

(72) Inventor: Kwang Eun Kim, Gyeonggi-do (KR)

(73) Assignee: SK Hynix Inc., Gyeonggi-do (KR)

(*) Notice: Subject to any disclaimer, the term of this patent is extended or adjusted under 35 U.S.C. 154(b) by 19 days.

(21) Appl. No.: 14/900,370

(22) PCT Filed: Jun. 25, 2014

(86) PCT No.: PCT/KR2014/005661
§ 371 (c)(1),
(2) Date: Dec. 21, 2015

(87) PCT Pub. No.: WO2014/209025
PCT Pub. Date: Dec. 31, 2014

(65) Prior Publication Data
US 2016/0165098 A1 Jun. 9, 2016

(30) Foreign Application Priority Data
Jun. 28, 2013 (KR) .................. 10-2013-0075129

(51) Int. Cl.
*H04N 1/60* (2006.01)
*H04N 9/67* (2006.01)
*H04N 9/68* (2006.01)

(52) U.S. Cl.
CPC ............. *H04N 1/6008* (2013.01); *H04N 9/67* (2013.01); *H04N 9/68* (2013.01)

(58) Field of Classification Search
CPC ...... H04N 1/60; H04N 1/6002; H04N 1/6005; H04N 1/6075; H04N 1/6008; H04N 9/67;
(Continued)

(56) References Cited

U.S. PATENT DOCUMENTS 5,231,504 A * 7/1993 Magee ................. H04N 1/6058
358/500
5,754,316 A * 5/1998 Hayashi ............... H04N 1/6075
358/512

(Continued)

FOREIGN PATENT DOCUMENTS

CN 1694489 11/2005
CN 102446345 5/2012

(Continued)

OTHER PUBLICATIONS

Office Action issued by the State Intellectual Property Office dated Jul. 20, 2017.

*Primary Examiner* — Jingge Wu
(74) *Attorney, Agent, or Firm* — IP & T Group LLP

(57) ABSTRACT

A method for a color correction using RGB data without a color space conversion for the color correction includes the steps of: extracting a start hue value of color coordinates from RGB input data; extracting an end hue value, which is finally modified by a color correction matrix user, from the start hue value according to each hue control value of a red color, a green color, a blue color, a yellow color, a cyan color and a magenta color (RGBYCM); converting input values R G and B, according to the end hue value, using a conversion formula for the corresponding input hue value among R, G and B conversion formulas; extracting a final saturation value from the end hue value according to an RGBYCM saturation control value; and calculating values of R, G and B according to modified start hue value, using an RGB color saturation value conversion formula.

6 Claims, 4 Drawing Sheets

(58) Field of Classification Search
CPC .......... H04N 9/68; H04N 9/69; H04N 1/6077;
H04N 1/6027; G06T 7/00; G06T 7/90;
G06T 2207/10024; G06K 9/4652
See application file for complete search history.

(56) References Cited

U.S. PATENT DOCUMENTS

| | | | |
|---|---|---|---|
| 6,028,646 A * | 2/2000 | Jeong | H04N 9/646 348/34 |
| 6,115,493 A * | 9/2000 | Harrington | G06T 11/001 382/162 |
| 6,404,916 B1 * | 6/2002 | De La Torre-Bueno | G06K 9/00127 382/162 |
| 7,773,804 B2 * | 8/2010 | Ting | G09G 5/026 345/600 |
| 2003/0002095 A1 * | 1/2003 | Gruzdev | H04N 1/62 358/518 |
| 2005/0185839 A1 * | 8/2005 | Matsubara | H04N 9/68 382/167 |
| 2005/0248581 A1 * | 11/2005 | Choe | H04N 1/62 345/581 |
| 2007/0076276 A1 * | 4/2007 | Jayaram | H04N 9/3194 358/518 |
| 2009/0214111 A1 * | 8/2009 | Zinaty | A61B 1/041 382/167 |
| 2013/0114894 A1 * | 5/2013 | Yadav | G06T 5/008 382/167 |
| 2015/0138227 A1 * | 5/2015 | Zhao | H04N 5/57 345/601 |

FOREIGN PATENT DOCUMENTS

| | | |
|---|---|---|
| JP | 2000-022977 | 1/2000 |
| JP | 2004-320675 | 11/2004 |
| JP | 2006-211093 | 8/2006 |
| JP | 2008-104046 | 5/2008 |
| JP | 2008-131211 | 6/2008 |
| JP | 2011-004021 | 1/2011 |
| JP | 2011-109287 | 6/2011 |

* cited by examiner

FIG. 3

| Input Check | Hue Formula |
|---|---|
| Max = R<br>Min = B | 60×(Mid-Max) / (Max-Min) |
| Max = G | 60×(2+(Mid-Max) / (Max-Min)) |
| Max = B | 60×(4+(Mid-Max) / (Max-Min)) |
| Max = R<br>Min = G | 360-60×(Mid-Max) / (Max-Min) |

FIG. 4

| End Hue Value | RGB Conversion Formula | | |
|---|---|---|---|
| | MAX | MIN | MID |
| 0-60 | R | B | G=Min+(ⓑ/60)×(Max-Min) |
| 60-120 | G | B | R=Min-(ⓑ/60-2)×(Max-Min) |
| 120-180 | G | R | B=Min-(ⓑ/60-2)×(Max-Min) |
| 180-240 | B | R | G=Min-(ⓑ/60-4)×(Max-Min) |
| 240-320 | B | G | R=Min-(ⓑ/60-4)×(Max-Min) |
| 320-360 | R | G | B=Min-((ⓑ-360)/60)×(Max-Min) |

FIG. 5

| @ | RGB Conversion Formula | | |
|---|---|---|---|
| | R | G | B |
| 0-60 | Max Formula | Mid | Min Formula |
| 60-120 | Mid | Max Formula | Min Formula |
| 120-180 | Min Formula | Max Formula | Mid |
| 180-240 | Min Formula | Mid | Max Formula |
| 240-320 | Mid | Min Formula | Max Formula |
| 320-360 | Max Formula | Min Formula | Mid |

METHOD FOR CORRECTING COLOR USING RGB DATA

This application is a national stage application of PCT/KR2014/005661 filed on Jun. 25, 2014, which claims priority of Korean patent application number 10-2013-0075129 filed on Jun. 28, 2013. The disclosure of each of the foregoing applications is incorporated herein by reference in its entirety.

TECHNICAL FIELD

The present invention relates to a technique for enabling a color correction to be implemented using RGB data, and more specifically, to a method for correcting a color using RGB data to implement the color correction using RGB data without a color space conversion for the color correction.

BACKGROUND ART

In general, an image display device such as a color television receiver, a beam projector and a color printer receives and decodes a color signal and reproduces an original image through a display device, e.g., an LCD panel.

However, since a color distortion is caused in the color signal received in the image display device due to various factors, a color correction is requested. Moreover, the image display device requests to compensate for a short portion of primary colors or a color correction of a visual sensation caused by a difference of color views depending on people.

In a conventional color correction method, data of a red color, a green color and a blue color (hereinafter, it is referred to as 'RGB') is converted into a color space, a color correction for adjusting a color saturation and hue, and a color-corrected color space is converted into RGB data.

FIG. 1a illustrates an original image and a histogram of the original image, and FIG. 1b illustrates a color-corrected image using a conventional color correction method and a histogram of the color-corrected image. If FIG. 1a is compared with FIG. 1b, a color loss occurs in an original image.

As described above, when the RGB data is converted into the color space to implement a color correction using the conventional color correction method, the color loss may occur in a conversion of the RGB data.

DISCLOSURE

TECHNICAL PROBLEM

The present invention is directed to a method for correcting a color using RGB data to implement the color correction using RGB data without a color space conversion for the color correction.

TECHNICAL SOLUTION

In accordance with an embodiment of the present invention, a method for correcting color using red color, green color and blue color (RGB) data includes steps of: extracting a start hue value of color coordinates from RGB input data; extracting an end hue value, which is finally modified by a color correction matrix user, from the start hue value according to each hue control value of a red color, a green color, a blue color, a yellow color, a cyan color and a magenta color (RGBYCM); converting input values R G and B, according to the end hue value, using a conversion formula for the corresponding input hue value among R, G and B conversion formulas; extracting a final saturation value from the end hue value according to an RGBYCM saturation control value; and calculating values of R, G and B according to modified start hue value, using an RGB color saturation value conversion formula.

Advantageous Effects

The present invention prevents a color loss in a color correction process by implementing a color correction using RGB data without a color space conversion for the color correction.

DESCRIPTION OF DRAWINGS

FIG. 3 is a table illustrating start hue values using hue formulas according to maximum/minimum values of RGB data.

FIG. 4 is a table illustrating RGB values according to end hue values using RGB conversion formulas.

FIG. 5 is a table illustrating RGB values according to start hue values using RGB hue saturation value conversion formulas.

BEST MODE

Hereinafter, various embodiments will be described below n more detail with reference to the accompanying drawings.

Figure 1A:
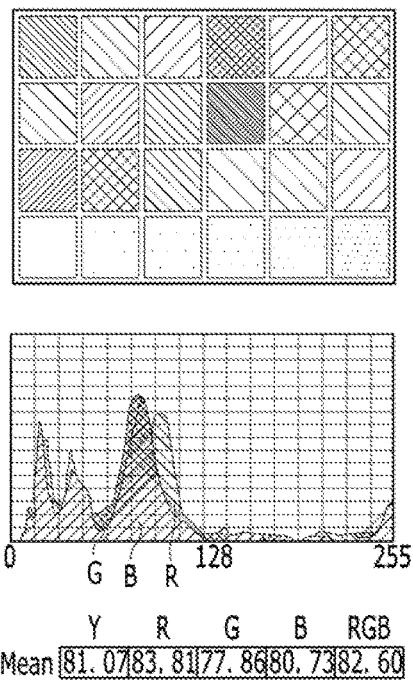
FIG. 1a illustrates an original image and a histogram of the original image.
Figure 1B:
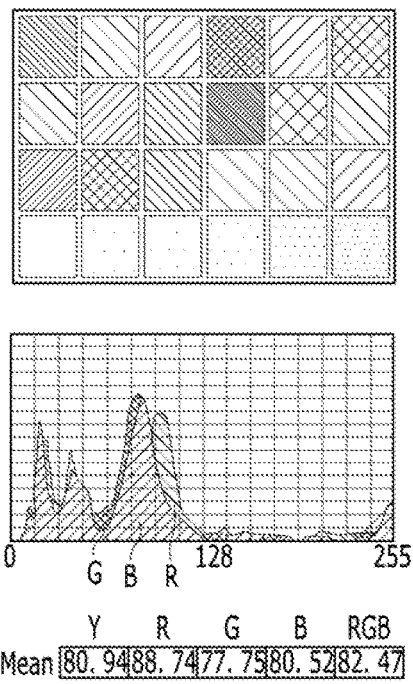
FIG. 1b illustrates a color-corrected image and a histogram of the color-corrected image using a conventional technique.
Figure 2:
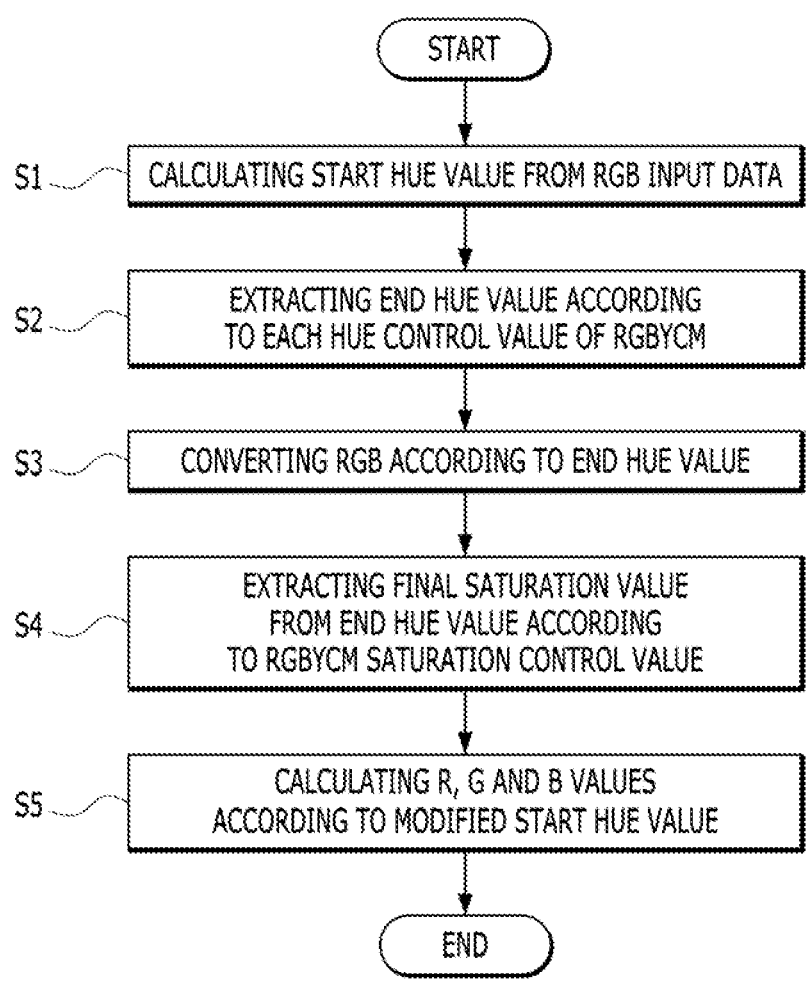
FIG. 2 is a signal flow chart illustrating a process of a color correction method using RGB data in accordance with an embodiment of the present invention.

FIG. 2 a signal flow chart illustrating a process of a color correction method using RGB data in accordance with an embodiment of the present invention. As shown in FIG. 2, a method for correcting color using RGB data comprises the steps of: extracting a start hue value S1, extracting an end hue value S2, converting RGB values S3, extracting a final saturation value S4 and calculating RGB hue saturation values according to modified start hue value S5.

FIG. 3 is a table illustrating start hue values using hue formulas according to maximum/minimum values of RGB data.

FIG. 4 is a table illustrating RGB values according to end hue values using RGB conversion formulas.

FIG. 5 is a table illustrating RGB values according to start hue values using RGB color saturation value conversion formulas.

Referring to FIGS. 2 to 5, a method for correcting color using RGB data will he described as below.

Firstly, a start hue value ⓐ for RGB input data is extracted at the step of S1. The start hue value represents a hue value of a color coordinate according to RGB input value, and more specifically, represents a hue control value determined by an angle of the color coordinate. The start hue value (color coordinate value) ⓐ may be obtained using a color formula according to a maximum/minimum value of RGB as shown in FIG. 3. The color value represents a hue value shown in the combination of the RGB.

In case that a maximum value Max of a corresponding pixel (input data) is a red color (hereinafter, the red color is referred to as 'R'), and a minimum value Min of the corresponding pixel is a blue color (hereinafter, the blue color is referred to as 'B'), the start hue value is calculated using the hue formula of "60×(Mid−Min)/(Max−Min)", where the Max denotes a maximum value among the RGB, the Mid denotes an intermediate value among the RGB, and the Min denotes a minimum value among the RGB.

Ranges of the maximum value Max the intermediate value Mid and the minimum value Min are determined by input bits. For example, if an input bit is 8 bit, the above-mentioned ranges are 255 determined by "$2^8-1$". In another example, if an input bit is 10 bit the above-mentioned ranges are 1023 determined by "$2^{10}-1$". The maximum value Max the intermediate value Mid and the minimum value Min are determined by the RGB input data.

Moreover, if the maximum value Max of the corresponding pixel is a green color (hereinafter, it is referred to as 'G'), the start hue value ⓐ is calculated using the hue formula of "60×(2+Mid−Min)/(Max−Min))". If the maximum value Max of the corresponding pixel is B, the start hue value ⓐ is calculated using the hue formula of "60×(4+(Mid−Min)/(Max−Min))". If the maximum value Max of the corresponding pixel is R and the minimum value Min of the corresponding pixel is G, the start hue value ⓐ is calculated using the hue formula of "360−60×(Mid−Min)/(Max−Min)".

Then, at the step S2, an end hue value ⓑ is extracted from the start hue value ⓐ according to each hue control value of a red color, a green color, a blue color, a yellow color, a cyan color and a magenta color (hereinafter, it is referred to as "RGBYCM"). The end hue value ⓑ is finally modified by a color correction matrix user. That is, the end hue value ⓑ is a color-corrected hue vale.

Subsequently, the RGB according to the end hue value ⓑ is converted using R, G and B conversion formulas such as the table shown in FIG. 4 at the step S3.

That is, if the end hue value ⓑ is ranged from 0 to 60, a maximum value Max is R and a minimum value Min is B, G of an intermediate value Mid is obtained by G conversion formula of "G=Min+(ⓑ/60)×(Max−Min)". Herein, "Min" represents B as the minimum value among RGB, "Max" represents R as the maximum value among RGB, and "end hue value ⓑ" represents a final hue value which the color correction matrix user wants finally. For example, if the color correction matrix user wants to convert a yellow color of the start hue value into a red color of the end hue value, a hue value of the yellow color is 30 (angle of color coordinate=30 degree) and a hue value of the red color is 0 (angle of color coordinate=0 degree).

Moreover, if the end hue value ⓑ is ranged from 60 to 120, a maximum value Max is G and a minimum value Min is B, R of an intermediate value Mid is obtained by R conversion formula of "R=Min−((ⓑ/60−2)×(Max−Min)".

If the end hue value ⓑ is ranged from 120 to 180, a maximum value Max is G and a minimum value Min is R, B of an intermediate value Mid is obtained by B conversion formula of "B=Min−((ⓑ/60−2)×(Max−Min)".

If the end hue value ⓑ is ranged from 180 to 240, a maximum value Max is B and a minimum value Min is R, G of an intermediate value Mid is obtained by G conversion formula of "G=Min−((ⓑ/60−4)×(Max−Min)".

If the end hue value ⓑ is ranged from 240 to 320, a maximum value Max is B and a minimum value Min is G R of an intermediate value Mid is obtained by R conversion formula of "R=Min−((ⓑ/60−4)×(Max−Min)".

If the end hue value ⓑ is ranged from 320 to 360, a maximum value Max is R and a minimum value Min is G, B of an intermediate value Mid is obtained by B conversion formula of "B=Min−((ⓑ−360)/60)×(Max−Min)".

As described above, R of the intermediate value Mid, G of the intermediate value Mid and B of the intermediate value Mid are obtained to control the intermediate value Mid. That is, a hue control represents to change a hue value, and a saturation control represents to change a density value of a color. Basically, the saturation depends on a difference between the maximum value and the minimum value, the color depends on an existing position of the intermediate value between the maximum value and the minimum value. Thus, the intermediate value is obtained such that the intermediate value exists at a near position to the maximum value or at a near position to the minimum value.

Subsequently, a final saturation value is extracted at the end hue value ⓑ according to an RGBYCM saturation control value at the step S4. The "final saturation value" is a color saturation value, which is finally changed by the color correction matrix user as described in the step S2.

Next, as shown in FIG. 5, a color correction for calculating R, G and B values using RGB color saturation value conversion formulas is performed according to modified start hue values ⓐ as shown in FIG. 5 at the step S5.

Since the hue then the saturation is modified, the end hue value ⓑ at the step S3 becomes the start hue value ⓐ of the saturation value at the step S5.

The intermediate value of R, G and B is not modified, a maximum value of the RGB color saturation value conversion formulas is modified using "Max+ⓑ×(Max−Mid)/(Max×(Max−Min)", and a minimum value of the RGB color saturation value conversion formulas is modified using "Min−ⓑ+(Max−Mid)/(Max−Min)". Herein, "Max" represents a maximum value among R, G and B, "Mid" represents an intermediate value among R, G and B, and "Min" represents a minimum value among R, G and B. For example, the intermediate value among R, G and B represents G value in case of R:100/G:50/B:0.

For example, if the maximum value is R and the start hue value ⓐ is ranged from 0 to 60, the maximum value R is modified using the conversion formula of "Max+ⓑ×(Max−Mid)/(Max×(Max−Min), and the minimum value B is modified using the conversion formula of "Min−ⓑ+(Max−Mid)/(Max−Min)". Herein, the intermediate value G is not modified.

Although various embodiments have been described for illustrative purposes, it will be apparent to those skilled in the art that various changes and modifications may be made without departing from the spirit and scope of the invention as defined in the following claims.

What is claimed is:

1. A method for correcting color using red color, green color and blue color (RGB) data, comprising steps of:
   (a) extracting a start hue value of color coordinates from RGB input data,
   wherein if a maximum value of a corresponding pixel is R and a minimum value of the corresponding pixel is B, calculating the start hue value using a color conversion formula of "60×(Mid−Min)/(Max−Min)";
   if the maximum value of the corresponding pixel is G, calculating the start hue value using the color conversion formula of "60×(2+(Mid−Min)/(Max−Min))";
   if the maximum value of the corresponding pixel is B, calculating the start hue value using the color conversion formula of "60×(4+(Mid−Min)/(Max−Min))";
   if the maximum value of the corresponding pixel is R and the minimum value of the corresponding pixel is G, calculating the start hue value using the color conversion formula of "60×(Mid−Min)/(Max−Min)", where the "Max" denotes a maximum value of the RGB, "Mid" denotes an intermediate value of the RGB and the "Min" denotes a minimum value of the RGB;

(b) extracting an end hue value, which is finally modified by a color correction matrix user, from the start hue value according to each hue control value of a red color, a green color, a blue color, a yellow color, a cyan color and a magenta color (RGBYCM);

(c) converting input values R G and B, according to the end hue value, using a conversion formula for the corresponding input hue value among R, G and B conversion formulas;

(d) extracting a final saturation value from the end hue value according to an RGBYCM saturation control value; and (e) calculating values of R, G and B according to modified start hue value, using an RGB color saturation value conversion formula.

2. A method for correcting color using red color, green color and blue color (RGB) data, comprising steps of:

(a) extracting a start hue value of color coordinates from RGB input data;

(b) extracting an end hue value, which is finally modified by a color correction matrix user, from the start hue value according to each hue control value of a red color, a green color, a blue color, a yellow color, a cyan color and a magenta color (RGBYCM);

(c) converting input values R G and B, according to the end hue value, using a conversion formula for the corresponding input hue value among R, G and B conversion formulas, wherein if the end hue value is ranged from 60 to 120, calculating R as the maximum value of the corresponding pixel, B as the minimum value of the corresponding pixel and G using G conversion formula of "G=Min+(ⓑ/60)×(Max−Min)";

if the end hue value is ranged from 0 to 60, calculating R as the maximum value of the corresponding pixel, B as the minimum value of the corresponding pixel and R using R conversion formula of "R=Min−(ⓑ/60−2)×(Max−Min)";

if the end hue value is ranged from 120 to 180, calculating G as the maximum value of the corresponding pixel, R as the minimum value of the corresponding pixel and B using B conversion formula of "B=Min−(ⓑ/60−2)×(Max−Min)";

if the end hue value is ranged from 180 to 240, calculating B as the maximum value of the corresponding pixel, R as the minimum value of the corresponding pixel and G using G conversion formula of "G=Min−(ⓑ/60−4)×(Max−Min)";

if the end hue value is ranged from 240 to 320, calculating B as the maximum value of the corresponding pixel, G as the minimum value of the corresponding pixel and R using R conversion formula of "R=Min−(ⓑ/60−4)×(Max−Min)";

if the end hue value is ranged from 320 to 360, calculating R as the maximum value of the corresponding pixel, G as the minimum value of the corresponding pixel and B using B conversion formula of "B=Min−(ⓑ/60−4)×(Max−Min)", where the "Max" denotes the maximum value of the RGB, the "Mid" denotes an intermediate value of the RGB, the "Min" denotes the minimum value of the RGB, and ⓑ denotes the end hue value;

(d) extracting a final saturation value from the end hue value according to an RGBYCM saturation control value; and (e) calculating values of R, G and B according to modified start hue value, using an RGB color saturation value conversion formula.

3. The method of claim 1, wherein in the step of (e), when R, G and B according to modified start hue value are calculated using the RGB color saturation value conversion formula, an intermediate value of R, G and B is not modified.

4. A method for correcting color using red color, green color and blue color (RGB) data, comprising steps of:

(a) extracting a start hue value of color coordinates from RGB input data;

(b) extracting an end hue value, which is finally modified by a color correction matrix user, from the start hue value according to each hue control value of a red color, a green color, a blue color, a yellow color, a cyan color and a magenta color (RGBYCM):

(c) converting input values R G and B, according to the end hue value, using a conversion formula for the corresponding input hue value among R, G and B conversion formulas;

(d) extracting a final saturation value from the end hue value according to an RGBYCM saturation control value; and (e) calculating values of R, G and B according to modified start hue value, using an RGB color saturation value conversion formula, wherein the RGB color saturation value conversion formula includes a maximum conversion formula of "Max+ⓑ×(Max−Mid)/(Max×(Max−Min)" and a minimum conversion formula of "Min−ⓑ+(Max−Mid)/(Max−Min)", where the "Max" denotes a maximum value of RGB, the "Mid" denotes an intermediate value of RGB, the "Min" denotes a minimum value of RGB, and the ⓑ denotes the end hue value.

5. The method of claim 2, wherein in the step of (e), when R, G and B according to modified start hue value are calculated using the RGB color saturation value conversion formula, an intermediate value of R, G and B is not modified.

6. The method of claim 4, wherein in the step of (e), when R, G and B according to modified start hue value are calculated using the RGB color saturation value conversion formula, an intermediate value of R, G and B is not modified.

* * * * *